July 8, 1958          J. C. OWEN          2,842,731

CONTROL SYSTEM FOR AIRCRAFT

Filed Sept. 22, 1955

*INVENTOR.*
JOHN C. OWEN
BY
Oscar B. Brumback
*ATTORNEY*

United States Patent Office 2,842,731
Patented July 8, 1958

2,842,731
CONTROL SYSTEM FOR AIRCRAFT

John C. Owen, Grand Rapids, Mich., assignor to Bendix Aviation Corporation, Teterboro, N. J., a corporation of Delaware Application September 22, 1955, Serial No. 535,873

5 Claims. (Cl. 318—489)

This invention relates generally to automatic control systems for aircraft.

As an aircraft moves through space, there is a tendency for the craft to oscillate about its axes. At the lower altitudes, the aerodynamic damping in pitch and roll is usually sufficient to return the craft to reference from a transient deflection with negligible kinetic energy. The smaller yaw surface areas are usually not sufficient to damp the oscillations so a rate of turn sensing device is provided to control the automatic pilot to damp the oscillations. However, the air mass which damps this oscillation is a function of air density. Since the density decreases with altitude, the damping afforded by this source diminishes with altitude and the craft becomes more susceptible to oscillation.

The tendency toward greater oscillation at high altitudes can be partially compensated for to some extent by increasing the output of the yaw rate gyro and equipping the automatic pilot with pitch and roll rate gyros. However, if the automatic pilot is to be adjusted for optimum control at a high altitude, the craft will then be over-controlled at low altitudes.

Closely allied with the problem of damping is the variation of aerodynamic control moment with airspeed, the control moment being the accelerating force due to deflection of the control surfaces. Since the control moment varies with the square of the airspeed, it is evident that large fluctuations can be encountered. Thus, if an autopilot be adjusted to provide a certain control surface deflection in response to a signal of given magnitude, then over-control and oscillation may result at high airspeeds and under-control and sluggishness may result at low airspeed. Such undercontrol, for example, may be dangerous in the case of automatic approach during gusty wind conditions.

An object of the present invention, therefore, is to provide an automatic pilot system with an adjustment for automatically varying the control signal as a function of a parameter of flight.

Another object is to provide an automatic pilot system with an adjustment for automatically varying the control signal as a function of Mach number.

Another object is to provide an automatic pilot system with an adjustment for automatically varying the control signal as a function of altitude.

Another object is to provide novel means for isolating one branch of a signal chain of an automatic control channel from the other while coupling signals to the first branch and adjusting the signal for a parameter of flight of the craft.

Another object is to provide a novel means for continually adjusting the signals of the automatic control system to give uniform performance of the automatic control system throughout a wide range of operating conditions encountered by the craft.

The present invention contemplates an automatic control system for aircraft wherein the transmitting leads connecting the sensors of the various branches of the control system are isolated from each other and the signals are adjusted as a function of the various flight parameters of the craft and coupled from one branch to another.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single sheet of drawing wherein like parts are marked alike:

Figure 1:
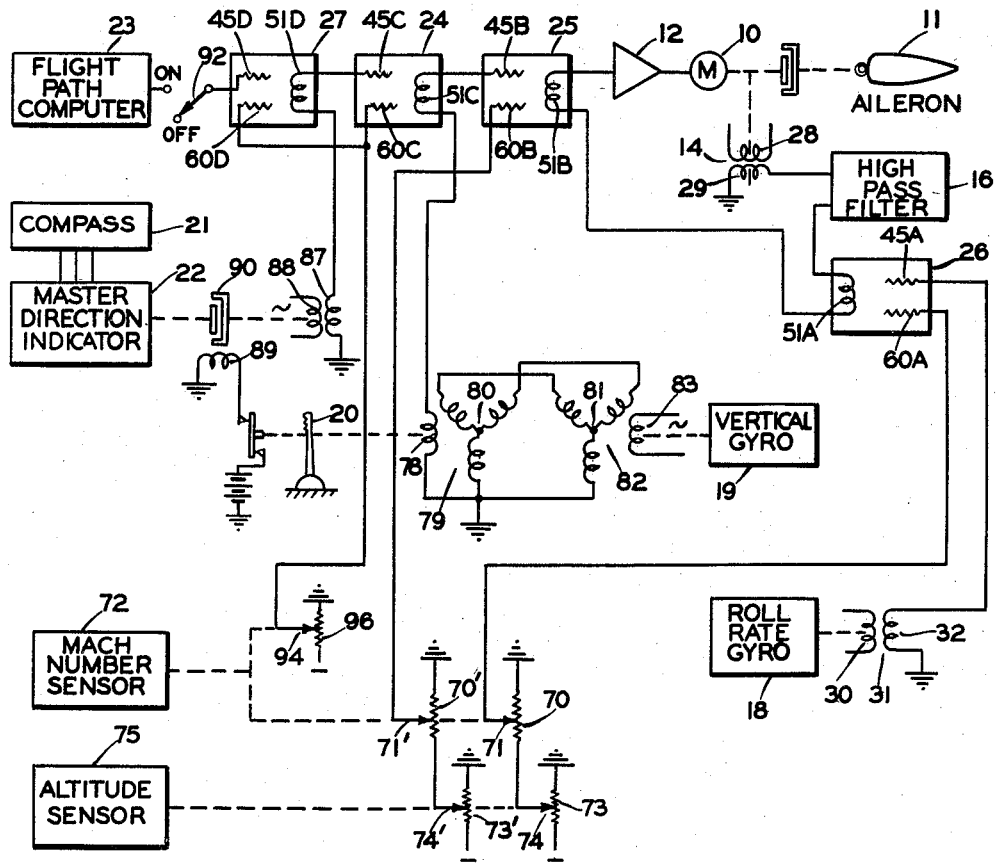
Figure 1 illustrates schematically a channel of an automatic control system made in accordance with the present invention for controlling the ailerons of an aircraft.

Although automatic control systems for aircraft normally stabilize the craft about three axes, only one channel of the novel automatic control system is illustrated in Figure 1 for purposes of simplicity. This channel comprises a servomotor 10 for displacing the aileron surface 11, an amplifier 12 for detecting the phase of control signals to control the direction of operation of motor 10; a follow-up device 14 for determining the extent of displacement of the control surface; a high pass filter 16 for cancelling the follow-up signal for sustained surface displacements; roll rate gyro 18 for preventing inertia from causing the craft to overshoot the ordered position; a vertical gyro 19 for measuring roll attitude; a manual controller 20 for commanding an attitude; compass 21 and master direction indicator 22 for determining heading errors; a flight path computer 23 for tracking a radio beam; and the novel isolation, coupling, and signal adjusting stations 24, 25, 26 and 27.

Motor 10, amplifier 12 and follow-up device 14 may be generally of the type described in U. S. Patent No. 2,625,348, issued January 13, 1953, to Noxon. Amplifier 12 discriminates the phase of a signal input and raises the signal a level sufficient to operate motor 10 which may be a conventional induction motor. Depending upon the phase of the signal, motor 10 operates in a clockwise or counterclockwise direction to displace the aileron surface; the operation of the motor also displacing the rotor 28 of follow-up inductive device 14 relative to its stator 29 to develop a corresponding signal.

While the follow-up signal from inductive device 14 is desirable for transient control surface displacements, it is not desired when the surface must be displaced for a sustained time to trim the craft. Therefore, the signal is applied to a high pass filter 16 which substantially eliminates the sustained signal while permitting transient signals to pass to amplifier 12. This filter may be similar to that described in copending application Serial No. 90,236, filed April 28, 1949, now Patent No. 2,754,418, assigned to the assignee of the present invention.

As the displaced surfaces cause the craft to move about the roll axis, a conventional roll rate gyro 18 responds to the rate of this movement. The displacement of the rotor 30 of an inductive device 31 relative to its stator 32 by roll rate gyro 18 develops a signal corresponding in phase and amplitude to the direction and extent of turning. This roll rate signal is combined with the follow-up signal at isolation station 26.

Since isolation stations 24, 25, 26, and 27 are all identical in structure they will be illustrated in Figure 1 only in detail as to suppressor grid, control grid, and secondary windings, and reference will be made to Figure 2 to show their structure.

Figure 2:
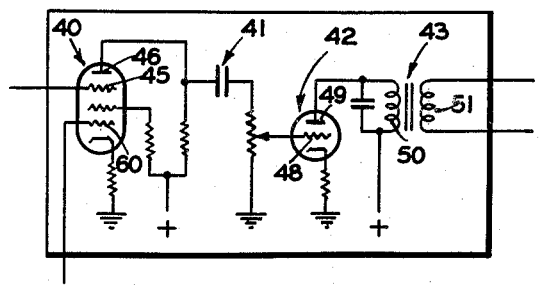
Figure 2 illustrates in detail an isolation and signal adjusting and coupling station of Figure 1.

The signal adjuster, Figure 2, comprises generally a pentode type vacuum tube 40, a coupling network 41, a triode type vacuum tube 42 and coupling transformer 43. As a control signal is applied to the suppressor grid 45 of pentode 40, the resulting signal appearing at the plate 46 is coupled through a conventional RC network 41 to the grid 48 of triode 42 whose plate 49 feeds the signal to the primary winding 50 of coupling transformer 43, the signal appearing at secondary winding 51.

The signal appearing at plate 46 of pentode 40 due to an input signal at grid 45 is also adjusted as a function of the signal or bias on the control grid 60 of the tube; this control grid bias being adjusted as a function of a parameter of flight of the craft.

Returning to Figure 1, the follow-up signal from inductive device 14 is applied through high pass filter 16 to the secondary winding 51A of adjuster 26, and the rate of turn signal from inductive device 31 is applied to the suppressor grid 45A of adjuster 26. The bias on control grid 60A of the adjuster is varied as a function of Mach number and altitude. To this end, a voltage divider 70 has its wiper 71 positioned as a function of Mach number by a conventional Mach sensor 72 and is excited by way of a potentiometer 73 whose wiper 74 is adjusted by conventional altitude sensor 75. Thus, the rate and follow-up signals are combined on secondary winding 51A.

The combined follow-up and rate of turn signal is applied to the secondary winding 51B of adjuster 25. The signal to the suppressor grid 45B of this station is derived of the secondary winding 51C of station 24. Connected to secondary winding 51C is the rotor 78 of a receiver inductive device 79 whose stator 80 is connected to the stator 81 of a transmitter inductive device 82. The rotor 83 of the transmitter is positioned by the conventional vertical gyro 19 and the rotor 78 of the receiver is positioned by manual controller 20 which may be of the type described in U. S. Patent No. 2,614,776 issued October 21, 1952 to F. H. S. Rossire. The bias for the control grid 60B is a function of Mach number and altitude and is derived from potentiometers 70' and 73' whose wipers 71' and 74' are moved by Mach sensor 72 and altitude sensor 75, respctively.

Combined with the roll attitude signal on winding 51C is a directional signal from a reference which is either from a heading alone or as modified by a guide beam. When a magnetic heading is used alone, the signal on suppressor grid 45C is supplied from the secondary winding 51D of station 27; this secondary winding 51D being connected to the stator 87 of an inductive device 88 in master directional indicator 22. Master directional indicator 22 and compass 21 may be generally of the type described in the aforesaid U. S. Patent No. 2,625,348 in that rotor 88 is displaced upon deviation from a heading at which the coil 89 of magnetic clutch 90 is energized. As appears in the aforementioned Patent No. 2,614,776, coil 89 is deenergized and clutch 90 disengaged when the controller 20 is displaced from center position.

When it is desired to control the aircraft in response to radio guide beams, a conventional flight path computer 23 may be engaged by moving switch 92 to the "on" position to provide a signal to the suppressor grid 45D of station 27. Such a computer may be of the type described in U. S. Patent No. 2,575,890 issued to C. M. Perkins on November 20, 1951.

The rate at which an aircraft returns to the guide beam or to the predetermined heading is a function of the error for which the craft is corrected and the airspeed of the craft. For this reason, the signals of isolation stations 24 and 27 are adjusted as a function of Mach number, Mach sensor 72 moving wiper 94 on potentiometer 96. On the other hand, the rate at which a craft turns about the roll axis and the extent to which a control surface must be displaced from the normal operating position are functions both of air speed and altitude. Accordingly, the magnitudes of the signals at the stations 25 and 26 coupling these signals to the signal chains are adjusted as a function of both Mach number and altitude.

The operation of the novel automatic control system now follows. Any displacement of the craft from its heading at the time coil 89 is energized and clutch 90 engaged relatively displaces rotor 88 and stator 87 to develop a signal corresponding in phase and amplitude to the direction and extent of displacement. This signal is applied by way of secondary winding 51D to the suppressor grid 45C of station 24. At station 24 the signal is modified by the bias on the suppressor grid as a function of Mach number. The resulting signal is applied by way of secondary winding 51C and to suppressor grid 45B of station 25 where it is again adjusted as a function of Mach number and altitude and the resultant signal applied to amplifier 12. Dependent upon the phase of this signal, motor 10 displaces aileron 11 in a clockwise or counterclockwise direction to correct for the error.

The displacement of aileron 11 continues until the follow-up signal developed by inductive device 14 is equal and opposite to the error signal. As the displaced aileron surface banks the craft, the roll attitude signal from inductive device 78 is applied to secondary winding 51C where it is mixed with the heading error signal. When the heading error and bank error signals are equal and opposite, the follow-up signal prevails to return the aileron to normal position.

As the craft banks it develops a rate of roll signal to damp the movement of the craft to prevent oscillation. Since the damping is a function the parameter of flight of the craft, the roll rate signal is applied to adjusting station 26 where it is modified as a function of Mach number and altitude. When it is desired to utilize the flight path computer, switch 92 is moved to the "on" position to provide for an additional signal.

The foregoing has presented an automatic control system for aircraft wherein the various branches supplying signals for the control system are isolated electrically from each other, the signals in each branch are adjusted as a function of parameters of flight, and the signals combined to provide a resultant signal for controlling the motors which displace the surface of the craft.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. An automatic control system for aircraft, comprising power means for controlling the attitude of a craft about an axis, means responsive to the attitude of the craft about said axis for developing a corresponding control signal for said power means, means operatively connecting said attitude responsive means and said power means, said connecting means including a station operable for adjusting said signal, means responsive to Mach number for operating said station, means responsive to altitude for operating said station, and means jointly connecting the one operating means with the other operating means in such a manner that said control signal is adjusted as a function of Mach number and altitude.

2. An automatic pilot system for aircraft comprising power means for controlling the attitude of the aircraft about an axis, means responsive to said attitude with respect to a predetermined attitude for developing a corresponding control signal for said power means, and means for transmitting said signal to said power means including thermionic means having control and suppressor grids, means for applying said signal to said suppressor grid, and means for supplying a signal corresponding to a function of Mach number and altitude to said control grid, whereby said control signal is modified as a function of Mach number and altitude.

3. An automatic pilot system for aircraft, comprising power means for controlling a craft about an axis, means responsive to the attitude of the craft about said axis for developing a corresponding control signal for said power means and means for transmitting said signal to said power means including thermionic means, means for applying said control signal to said thermionic means, means providing a bias to modify said control signal in said thermionic means, and means for adjusting said bias as a function of Mach number and altitude, whereby said control signal is modified as a function of Mach number and altitude.

4. A control system for an aircraft, comprising power means for stabilizing the craft about an axis, first means responsive to the attitude of the craft about said axis for providing an attitude signal, second means responsive to the rate of change of attitude about said axis for providing a rate signal for damping the action of the craft about said axis and third reference means for providing a signal for maintaining the aircraft in a predetermined direction, means connecting said first, second and third means to said power means, the extent of operation of said power means in response to a given signal from said third means being variable as a function of Mach number and the extent of operation of said power means by said first and second signals being variable as a function of altitude and Mach number, and means isolating said reference means and said first and second means from and coupling said signals to said connecting means, said connecting means including means for varying said signals as a function of Mach number and altitude as aforesaid.

5. A control system for an aircraft comprising power means for controlling the attitude of the craft about an axis, first means responsive to the deviation in the attitude of the craft about said axis with respect to a predetermined attitude for providing an attitude error signal, second means responsive to the rate of change of attitude about said axis for providing a rate signal for damping the action of the craft about said axis, and means transmitting said signals to said power means, said transmitting means including a control means to vary the extent of operation of said power means effected in response to a given signal from said first means, and other control means to vary the extent of damping effected in response to a given rate signal from said second means, said transmitting means including Mach number and altitude responsive means to operate said first and second-mentioned control means for varying said signals as a function of Mach number and altitude.

References Cited in the file of this patent
UNITED STATES PATENTS

| | | |
|---|---|---|
| 2,620,149 | Strother | Dec. 2, 1952 |
| 2,701,111 | Schuck | Feb. 1, 1955 |